(12) United States Patent
Yamada

(10) Patent No.: US 7,336,314 B2
(45) Date of Patent: Feb. 26, 2008

(54) IMAGE ACQUIRING METHOD AND IMAGE ACQUIRING APPARATUS

(75) Inventor: Makoto Yamada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 699 days.

(21) Appl. No.: 10/406,233

(22) Filed: Apr. 4, 2003

(65) Prior Publication Data
US 2003/0189665 A1 Oct. 9, 2003

(30) Foreign Application Priority Data
Apr. 4, 2002 (JP) ............................. 2002-102255

(51) Int. Cl.
H04N 5/222 (2006.01)
(52) U.S. Cl. ...................... 348/371; 348/370
(58) Field of Classification Search ................ 348/370, 348/371, 207.99, 223.1, 68, 47, 218.1, 268, 348/269, 224.1, 270; 358/509
See application file for complete search history.

(56) References Cited

U.S. PATENT DOCUMENTS

| | | | |
|---|---|---|---|
| 5,815,204 A * | 9/1998 | Abe et al. ................... 348/371 |
| 6,456,203 B1 * | 9/2002 | Schomaker et al. ........ 340/638 |
| 6,546,203 B2 * | 4/2003 | Hofer .......................... 396/155 |
| 6,674,488 B1 * | 1/2004 | Satoh .......................... 348/663 |
| 6,963,362 B1 * | 11/2005 | Nakayama ............... 348/224.1 |
| 2002/0089599 A1 * | 7/2002 | Menning .................... 348/370 |
| 2003/0052978 A1 * | 3/2003 | Kehtarnavaz et al. .... 348/223.1 |

\* cited by examiner

Primary Examiner—David Ometz
Assistant Examiner—Tuan Le
(74) Attorney, Agent, or Firm—Sughrue Mion, PLLC

(57) ABSTRACT

The image acquiring method and image acquiring apparatus photograph an image of a subject using stroboscopic light as external illumination. The method and apparatus compare, in terms of color change, an image acquired without using the stroboscopic light and images acquired by using a plurality of different kinds of stroboscopic light and select one kind of stroboscopic light which has the least color change to thereby finally acquire the image from among the plurality of different kinds of stroboscopic light. There is no color change due to the use of the stroboscopic light and the image having natural color reproduction can be obtained.

14 Claims, 3 Drawing Sheets

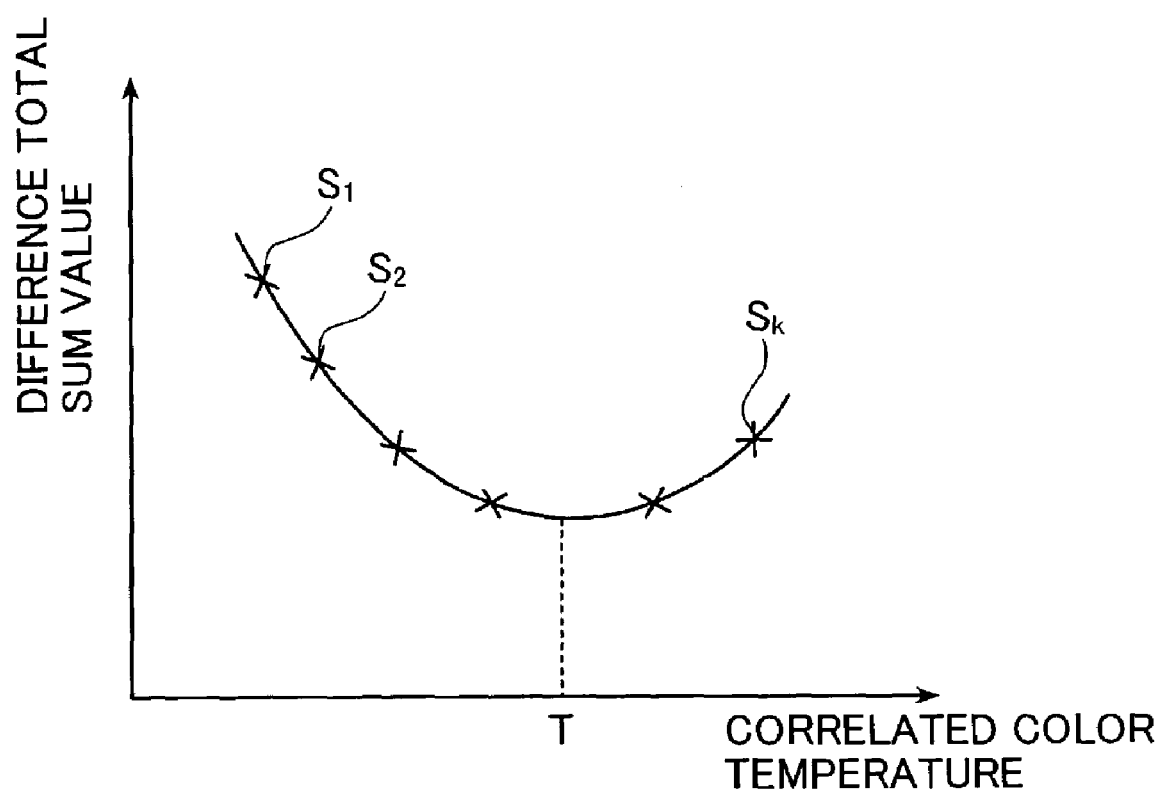

IMAGE ACQUIRING METHOD AND IMAGE ACQUIRING APPARATUS

BACKGROUND OF THE INVENTION

1. Field of the Invention

The present invention relates in general to an image acquiring method. More particularly, the present invention relates to an image acquiring method applied in the case where there is a difference in color temperature between ambient light illuminating a subject to be photographed using external illumination such as stroboscopic light and daylight. The present invention also relates to an image acquiring apparatus for implementing the image acquiring method.

2. Description of the Related Art

Heretofore, external illumination such as stroboscopic light is commonly used when a subject to be photographed using a camera for silver salt films or a digital camera is dark. The stroboscopic light is usually so-called white light. Then, when a film of a daylight type is used or when the white balance of a digital camera is set at daylight, satisfactory color reproduction is obtained without especially carrying out the color correction.

In recent years, the high sensitivity of a silver salt film or a digital camera has been improved, and, in the case where the stroboscopic photographing is carried out in a room, even in the background which the stroboscopic light does not reach, if there is the slight brightness therein, the background is recorded as an image without becoming solid black.

However, when stroboscopic photographing is carried out in a room using stroboscopic light whose kind is different from that of indoor illumination, there is encountered a problem in that the colors of the obtained image are reproduced so as to differ depending on the part in the image so that the image comes out unnatural.

For example, when a subject is photographed in a room illuminated by a tungsten lamp using stroboscopic light, an area which the stroboscopic light reaches is illuminated by the white light, while an area which the stroboscopic light does not reach is illuminated by tungsten light.

In general, the image photographed on a color negative film is subjected to the color correction when being printed, whereby even in the case where the illumination is not the white light, that image can be subjected to the color correction so as to be capable of obtaining satisfactory color reproduction. However, if the color of the illumination light differs depending on the part in the image as in the case described above, any of the colors is selected for carrying out the correction. Since the finally obtained image differs in color depending on the part therein, it comes out very unnatural in a visual sense.

After all, in such a case, it is unavoidable that the finally obtained image becomes the image having the unnatural colors. This is also the case with the white balance correction of a digital camera.

SUMMARY OF THE INVENTION

In the light of the foregoing, the present invention has been made in order to solve the above-mentioned problems associated with the prior art, and it is, therefore, a first object of the present invention to provide an image acquiring method which is capable of preventing the color from differing between an area which stroboscopic light reaches and an area which the stroboscopic light does not reach to obtain an image having the natural color reproduction even in the case where a subject is photographed using external illumination such as stroboscopic light while being illuminated by illumination other than white light.

It is a second object of the present invention to provide an image acquiring apparatus for implementing the image acquiring method described above.

In order to solve the first object mentioned above, the first aspect of the present invention provides an image acquiring method, in which an image of a subject is photographed using stroboscopic light as external illumination, comprising the steps of comparing, in terms of color change, an image acquired without using the stroboscopic light and images acquired by using a plurality of different kinds of stroboscopic light; and selecting one kind of stroboscopic light which has the least color change from among the plurality of different kinds of stroboscopic light, thereby finally acquiring the image.

Preferably, the plurality of different kinds of stroboscopic light have colors changed along a black body radiation locus and that a point on the black body radiation locus corresponding to a color of the kind of stroboscopic light which has the least color change between the image acquired without using the stroboscopic light and each of the images acquired using the plurality of different kinds of stroboscopic light is obtained, and the kind of stroboscopic light having the color determined by the point is used to finally acquire the image.

Preferably, an inverse number correlated color temperature of the kind of stroboscopic light used when the image is finally acquired is in a range of ±50 mired with respect to the inverse number correlated color temperature of a black body radiation locus corresponding to the color of the kind of stroboscopic light which has the least color change.

And, preferably, when the color change is determined, a color of each image is decomposed into a luminance signal and a chromaticity signal, and a magnitude of the color change is determined using a difference in the chromaticity signal.

In order to solve the first object mentioned above, the second aspect of the present invention provides an image acquiring method, comprising the steps of photographing a reference object or a subject using a plurality of different kinds of stroboscopic light as external illumination and without using stroboscopic light to acquire first images photographed respectively with the plurality of different kinds of stroboscopic light and a second image photographed without the stroboscopic light; determining a color change between the second image and each of the first images to obtain color changes of the first images, respectively; comparing the color changes of the first images photographed respectively with the plurality of different kinds of stroboscopic light; selecting one stroboscopic light in which the color change is least from among the plurality of different kinds of stroboscopic light; and thereby acquiring a final image of the subject.

Preferably, the acquiring step of the final image is a step of photographing the subject using the stroboscopic light to acquire the final image when the first images and the second image are acquired by photographing the reference object or a step of determining as the final image one image of the first images which is acquired by photographing the subject using the stroboscopic light when the first images and the second image are acquired by photographing the subject.

In order to solve the second object mentioned above, the third aspect of the present invention provides an image acquiring apparatus for photographing an image of a subject using stroboscopic light as external illumination, comprising photographing means for photographing the image of the subject; a stroboscopic lamp for emitting a plurality of different kinds of stroboscopic light having different colors; means for obtaining color change between an image acquired without using the stroboscopic light and each of images acquired using the plurality of different kinds of stroboscopic light; and stroboscopic light color selecting means for selecting one kind of stroboscopic light which has the least color change for finally acquiring the image from among the plurality of different kinds of stroboscopic light.

Preferably, the plurality of different kinds of stroboscopic light emitted from the stroboscopic lamp have the colors changed along a black body radiation locus and that the stroboscopic light color selecting means selects the kind of stroboscopic light for finally acquiring the image, based on a point on the black body radiation locus corresponding to a color of the kind of stroboscopic light having the least color change between the image acquired without using the stroboscopic light and the images acquired using the plurality of different kinds of stroboscopic light.

Preferably, an inverse number correlated color temperature of the kind of stroboscopic light selected by the stroboscopic light color selecting means is in a range of ±50 mired with respect to the inverse number correlated color temperature of a black body radiation locus corresponding to the color of the kind of stroboscopic light having the least color change.

Preferably, the image acquiring method further comprises decomposing means for decomposing the color of each image into a luminance signal and a chromaticity signal and that the color change is obtained by determining a magnitude of the color change using only a difference in the chromaticity signal.

BRIEF DESCRIPTION OF THE DRAWINGS

In the accompanying drawings:

FIG. 3 is a graphical representation showing the relationship between a correlated color temperature and a total sum of differences.

DETAILED DESCRIPTION OF THE PREFERRED EMBODIMENTS

An image acquiring method and an image acquiring apparatus of the present invention will hereinafter be described in detail with reference to preferred embodiments shown in the accompanying drawings.

Figure 1:
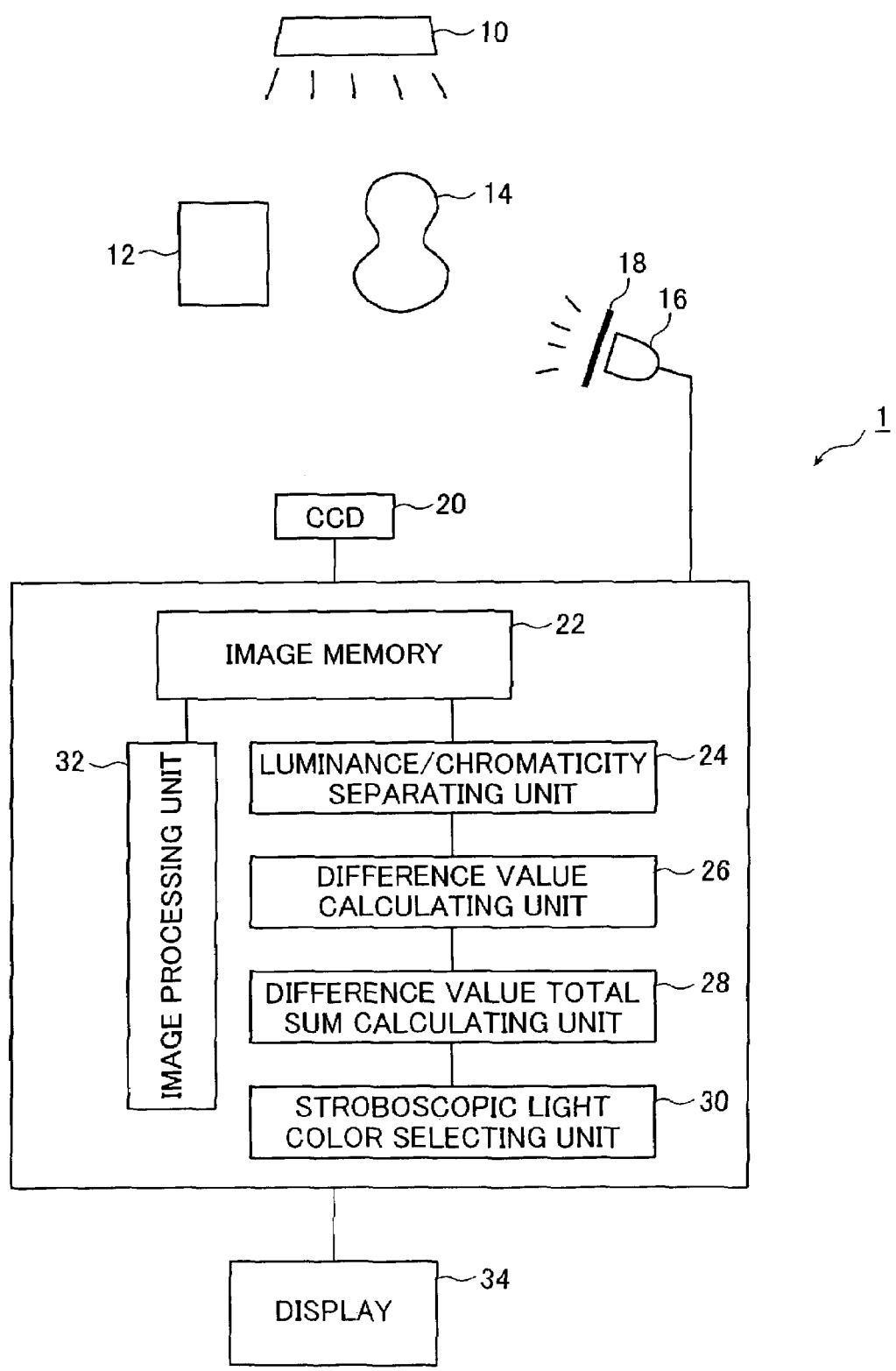
FIG. 1 is a block diagram showing schematically a configuration of an image acquiring apparatus for implementing an image acquiring method according to the present invention.

FIG. 1 is a block diagram showing schematically a configuration of an image acquiring apparatus of the present invention for implementing an image acquiring method according to the present invention.

As shown in FIG. 1, an image acquiring apparatus 1 is used to shoot a reference object 12 or a subject 14 under an illumination light source 10 using stroboscopic light emitted from a stroboscopic lamp 16.

The image acquiring apparatus 1 includes a CCD 20 as image capturing means for capturing an image; an image memory 22 for storing therein the captured image data; a luminance/chromaticity separating unit 24 as means for obtaining the color change of each image; a difference value calculating unit 26; a difference value total sum calculating unit 28; a stroboscopic light color selecting unit 30 for selecting stroboscopic light used to finally acquire an image; and an image processing unit 32 for subjecting the acquired image to various kinds of image processing. A display 34 for displaying thereon an image or various messages is also connected to the image acquiring apparatus 1.

The present invention aims at acquiring an image which has no unnatural color variations dependent on the positions in an image and on which colors are naturally reproduced, even in the case where a subject illuminated by light other than white light is shot using external illumination such as stroboscopic light. There is no particular limitation on the illumination light source 10.

The reference object 12 is used to repeatedly perform photographing with stroboscopic light of varying colors and finally select stroboscopic light to be used in the photographing. The reference object 12 is not particularly required, if the object 14 is subjected to (test) photographing with a plurality of kinds of stroboscopic light from the beginning.

The stroboscopic lamp 16 is assumed to emit light of varying colors. The method of changing the color of light from the stroboscopic lamp 16 is not particularly limited. Exemplary methods are as follows:

A method of changing the light color is to arrange filters 18 in front of the stroboscopic lamp 16 and use a particular filter selected by switching the filters 18 from one to another. In this case, the method in which, for example, a plurality of filters are arranged along the periphery of a disc, and this disc is rotated to switch the filters from one to another at a high speed is practical. Preferable examples of the filter include color filters such as Wratten Filter manufactured by Kodak Co., Ltd., and the Fuji Filter manufactured by Fuji Photo Film Co., Ltd. which will be described later.

Another method uses BGR stroboscopic lamps. In this method, light of a desired color is obtained by providing stroboscopic lamps emitting B (blue), G (green) and R (red) light and controlling the respective amounts of light emission. This method is capable of more minute adjustment of the color of stroboscopic light as compared with the method using the filters described above.

The stroboscopic light color to be changed is preferably changed along the black body radiation locus, for example.

The image acquiring apparatus 1 is specifically a digital still camera (DSC) but is not limited to the DSC. The image acquiring apparatus 1 may be an image pickup device including an image pickup unit such as a CCD, a microcomputer for subjecting image data to the processing to be described below, and a display.

In addition, it is also possible to acquire light from the whole subject by averaging with three sensors in which a photoelectric receiving device such as an SPD is combined with the filters of B, G and R. In this case, the later procedure for obtaining the total sum of difference values becomes unnecessary.

The image memory 22 is used to store therein the image data which was obtained through the photographing using no stroboscopic lamp 16, or through a plurality of photographing operations made by switching the filters 18 from one to another.

In addition, the luminance/chromaticity separating unit 24, the difference value calculating unit 26, and the difference value total sum calculating unit 28 constitute the means for obtaining the color change between an image acquired without using the stroboscopic light, and the images acquired using a plurality of different kinds of stroboscopic light.

That is to say, the color change between the image acquired without using the stroboscopic light and the plural images acquired while changing the color of the stroboscopic light is obtained using that means, and the stroboscopic light which is closest to the light emitted from the illumination light source is selected on the basis of that result to photograph the subject 14 using the selected stroboscopic light to thereby finally acquire the image.

Since at this time, not only the color is changed, but also the brightness is changed depending on whether or not the stroboscopic lamp is lighted, first of all, the luminance and the chromaticity are separated from each other by the luminance/chromaticity separating unit 24 to remove the difference in brightness. While this separation method is not especially limited, for example, the RGB data obtained through the photographing has to be converted into the data of the Y, Cr and Cb values with a predetermined conversion expression as will be described later. Here, the value Y is the luminance data, and hence only the values Cr and Cb have to be used.

With respect to the pixels of the image acquired without using the stroboscopic light and a plurality of images acquired while changing the color of the stroboscopic light, the difference value calculating unit 26 calculates the difference values of the colors therebetween. In the difference value total sum calculating unit 28, the total sum of the difference values of the pixels is calculated.

In the stroboscopic light color selecting unit 30, the stroboscopic light color with which the value of the total sum becomes least is obtained to select the corresponding stroboscopic light.

At this time, when a plurality of stroboscopic light colors are changed along the black body radiation locus, a point on the black body radiation locus corresponding to the point at which the above-mentioned total sum becomes smallest is obtained to select the stroboscopic light corresponding to that point.

Alternatively, instead of selecting the stroboscopic light corresponding to the point on the black body radiation locus at which the value of the above-mentioned total sum becomes smallest, the stroboscopic light having such light color as to fall within the range of ±50 mired with respect to the inverse number correlated color temperature of the black body radiation locus corresponding to that point may be selected and used in the photographing.

The reason why the range of 50 mireds is adopted is that the value concerned is 10 times as large as the identifiable mired difference of about 5, and is the value for which it is assumed that if the inverse number correlated color temperature does not practically fall within this range, then the difference in color is recognized, which may raise a problem.

The subject 14 is photographed using the stroboscopic light selected in such a manner.

At this time, in the case where the reference object 12 was not photographed, but the subject 14 was photographed from the beginning using a plurality of stroboscopic light, since the subject 14 is already photographed using the selected stroboscopic light, it is unnecessary to carry out the photographing again.

The image processing unit 32 subjects the image of the subject finally acquired to the predetermined image processing such as the white balance adjustment as required to output the resultant image as the final image.

The description will hereinbelow be given with respect to an image acquiring method according to the present embodiment with reference to a flow chart of FIG. 2.

Figure 2:
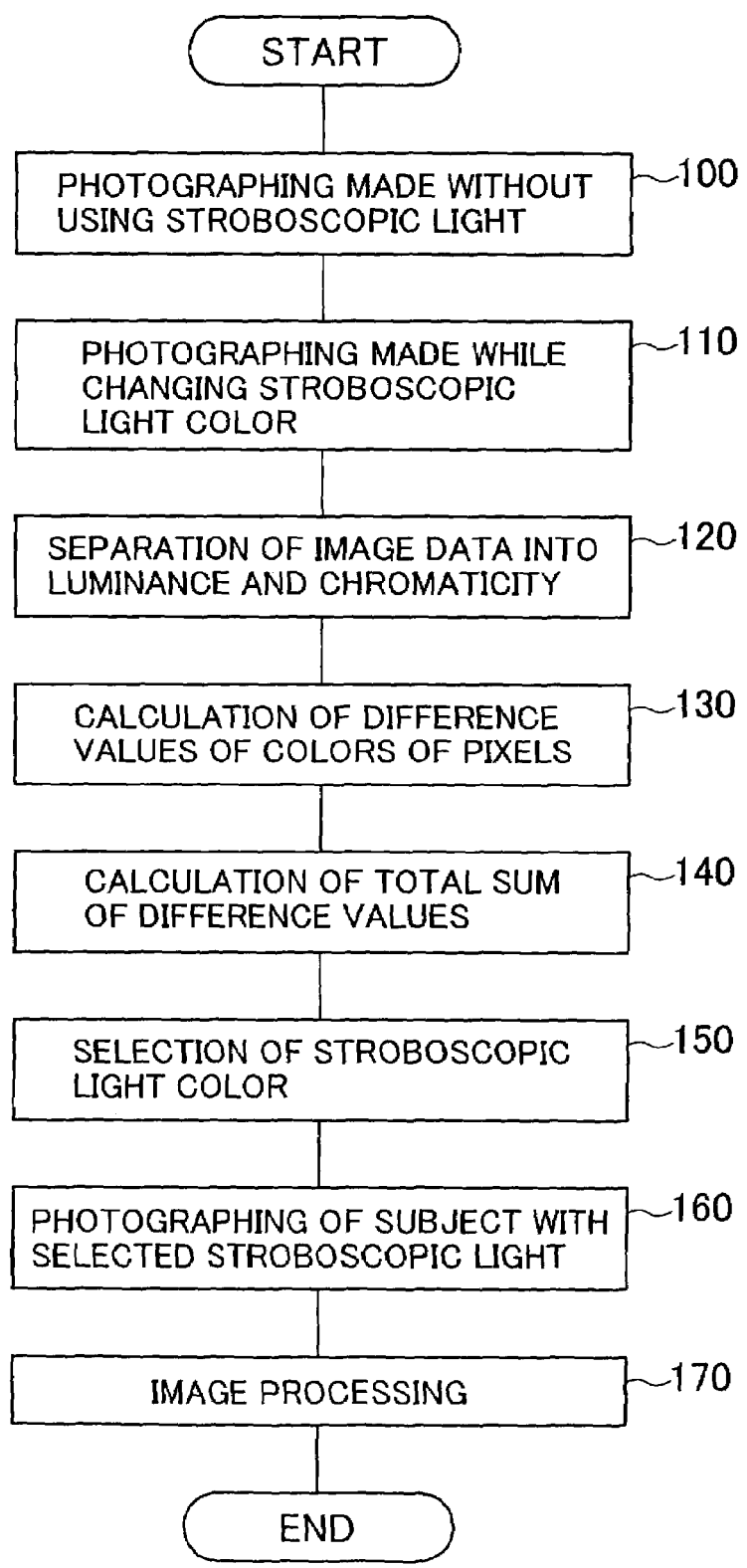
FIG. 2 is a flow chart useful in explaining the flow of processing of the image acquiring method according to the embodiment under consideration.

First of all, in Step 100 of FIG. 2, the reference object 12 or the subject 14 is photographed without using the stroboscopic lamp 16.

Next, in Step 110, a plurality of kinds of photographing operations are carried out for the reference object 12 or the subject 14 while changing the stroboscopic light color by switching the filters 18 from one to another. Preferably, the photographing made without using the stroboscopic lamp 16 and a plurality of kinds of photographing operations made while switching the filters 18 from one to another are automatically carried out.

The image data obtained through these photographing operations is stored in the image memory 22.

In Step 120, the luminance/chromaticity separating unit 24 separates each photographed image data into the luminance value and the chromaticity value. This separation method is not especially intended to be limited. For example, as described above, the RGB signal data has to be converted into the YCrCb signal data.

In Step 130, in the difference value calculating unit 26, the difference values of the colors of the pixels are calculated using the chromaticity data (e.g., Cr and Cb) which has just been obtained through the separation.

Then, in Step 140, in the difference value total sum calculating unit 28, the total sum of the difference values that have just been calculated is calculated.

In Step 150, in the stroboscopic light color selecting unit 30, a point on the black body radiation locus at which the total sum of the difference values calculated as described above becomes smallest is obtained to select the stroboscopic light having the light color corresponding to that point.

After selection of the stroboscopic light, in Step 160, the subject 14 is photographed using this stroboscopic light to acquire the final image.

Finally, in Step 170, the image processing unit 32 subjects the finally acquired image data to predetermined image processing such as the white balance adjustment as required to obtain the final image.

A more specific embodiment will hereinbelow be described.

First of all, a subject which is being illuminated by a tungsten color fluorescent lamp as an illumination light source was photographed using a digital camera Fine Pix 4700 manufactured by Fuji Photo Film Co., Ltd. without using the stroboscopic light. Note that this photographing was carried out while the white balance adjustment of the camera set at daylight remained unchanged.

Hereinbelow, all the photographing operations using the digital camera Fine Pix 4700 were carried out while the white balance adjustment set at daylight remained unchanged.

Next, the same subject was photographed with the above-mentioned camera using the stroboscopic light. In the photographing using the stroboscopic light, the Wratten Filters 81D, 85C, 85B, 85B+81D, 82C, 80C and 80A manufactured by Kodak Co., Ltd. were installed in the front of the stroboscopic lamp to change the stroboscopic light color, and also the stroboscopic lamp was lighted without any of the filters to carry out the photographing eight times. Thus, the eight kinds of photographing operations were carried out to acquire the images for which the respective kinds of stroboscopic light are used.

Next, the RGB values (R, G, B) of the points of the image photographed without using any of the stroboscopic light were converted into the YCC values (Y, Cr, Cb) on the basis of the following Expression (1) to separate the image signal into the luminance signal and the chromaticity signal.

$$\begin{bmatrix} Y \\ Cr \\ Cb \end{bmatrix} = \begin{bmatrix} 0.3 & 0.6 & 0.1 \\ 0.7 & -0.6 & -0.1 \\ -0.3 & -0.6 & 0.9 \end{bmatrix} \begin{bmatrix} R \\ G \\ B \end{bmatrix} \quad (1)$$

In addition, similarly, the RGB values (R', G', B') of the points of the images photographed using the above-mentioned stroboscopic light were converted into the YCC values (Y', Cr', Cb') on the basis of the following Expression (2) to separate the image signal into the luminance signal and the chromaticity signal.

$$\begin{bmatrix} Y' \\ Cr' \\ Cb' \end{bmatrix} = \begin{bmatrix} 0.3 & 0.6 & 0.1 \\ 0.7 & -0.6 & -0.1 \\ -0.3 & -0.6 & 0.9 \end{bmatrix} \begin{bmatrix} R' \\ G' \\ B' \end{bmatrix} \quad (2)$$

Next, the difference in color (difference value) Dc was calculated on the basis of the following Expression (3) from the Cr and Cb values, and the Cr' and Cb' values of the points of the images which were calculated on the basis of Expressions (1) and (2).

$$Dc = [(Cr - Cr')^2 + (Cb - Cb')^2]^{1/2} \quad (3)$$

The difference values Dc of the pixels thus obtained were added over the whole image to calculate the total sum of quantities of differences with respect to the respective images. The total sum values of the difference values Dc for the image for each filter used above are shown in Table 1.

TABLE 1

| Kind of filter | Total sum of Dc (relative value) |
|---|---|
| 85B + 81D | 0.62 |
| 85B | 0.59 |
| 85C | 0.75 |
| 81D | 0.82 |
| No filter | 1.00 |
| 82C | 1.11 |
| 80C | 1.18 |
| 80A | 1.29 |

The total sums of the difference values Dc of the images obtained in such a manner were compared with one another. Thus, the well known white balance correction was carried out for the image in which the total sum value becomes smallest, in this case, as can be seen from Table 1, the image for which the filter 85B was used, to adjust the white balance of the whole image, whereby it was possible to obtain the image having the natural color reproduction in which no color differs between an area which the stroboscopic light emitted from the stroboscopic lamp reaches and an area which the stroboscopic light from the stroboscopic lamp does not reach.

In the embodiment described above, there was simply selected the image photographed using the stroboscopic light with which the total sum value of the difference values of the colors of the image becomes simply smallest. However, the stroboscopic light used in the photographing may be selected based on the point on the black body radiation locus corresponding to the light color of the stroboscopic light. For example, a subject may be photographed using the stroboscopic light having such an inverse number correlated color temperature as to fall within the range of ±50 mired with respect to the inverse number correlated color temperature of the black body radiation locus corresponding to such a point.

In addition, the most suitable correlated color temperature may be determined from the relationship between the correlated color temperatures of the stroboscopic light actually given and the total sum value of the differences, and then the corresponding stroboscopic light may be used.

For example, a minimum value (which does not necessarily correspond to the given stroboscopic light) in the curve which is obtained by linking smoothly points S1, S2, . . . , Sk plotted for the relationship between the correlated color temperatures of the actually given stroboscopic light and the total sum of the differences as shown in FIG. 3 is regarded as the optimal value T of the correlated color temperature, and the stroboscopic light corresponding thereto is used.

While in the above description, the image acquiring method and image acquiring apparatus of the present invention have been described in detail, it is to be understood that the present invention is not intended to be limited to the above-mentioned embodiments, and various improvements and modifications may be made without departing from the subject matter of the present invention.

As set forth hereinabove, according to the present invention, even when a subject is photographed using external illumination such as a stroboscopic light while being illuminated with an illumination other than white light, no color differs between an area which the stroboscopic light reaches and an area which the stroboscopic light does not reach, and hence it is possible to obtain an image having natural color reproduction.

What is claimed is:

1. An image acquiring method, in which an image of a subject is photographed using stroboscopic light as external illumination, comprising the steps of:
    comparing, in terms of color change, an image of said subject acquired without using the stroboscopic light and images of said subject acquired by using a plurality of different kinds of stroboscopic light; and
    selecting one kind of stroboscopic light which has the least color change from among said plurality of different kinds of stroboscopic light, thereby finally acquiring the image of said subject.

2. The image acquiring method according to claim 1, wherein said plurality of different kinds of stroboscopic light have colors changed along a black body radiation locus and that a point on the black body radiation locus corresponding to a color of said one kind of stroboscopic light which has the least color change between said image acquired without using said stroboscopic light and each of said images acquired using said plurality of different kinds of stroboscopic light is obtained, and said one kind of stroboscopic light having the color determined by said point is used to finally acquire the image.

3. The image acquiring method according to claim 1, wherein an inverse number correlated color temperature of said one kind of stroboscopic light used when the image is finally acquired is in a range of ±50 mired with respect to the inverse number correlated color temperature of a black body radiation locus corresponding to the color of said one kind of stroboscopic light which has the least color change.

4. The image acquiring method according to claim 1, wherein, when said color change is determined, a color of each image is decomposed into a luminance signal and a chromaticity signal, and a magnitude of said color change is determined using a difference in the chromaticity signal.

5. The image acquiring method according to claim 1, wherein said comparison in terms of color change comprises the steps of:
calculating difference values of colors between said image acquired without using the stroboscopic light and said images acquired by using a plurality of different kinds of stroboscopic light with respect to pixels of each image;
calculating a total sum of said difference values of the pixels;
comparing said total sum of each image; and
one kind of stroboscopic light with which the value of the total sum becomes least is selected as a stroboscopic light which has the least color change from among said plurality of different kinds of stroboscopic light.

6. An image acquiring method, comprising the steps of:
photographing a reference object or a subject using a plurality of different kinds of stroboscopic light as external illumination and without using stroboscopic light to acquire first images photographed respectively with said plurality of different kinds of stroboscopic light and a second image photographed without the stroboscopic light;
determining a color change between said second image and each of said first images to obtain color changes of said first images, respectively;
comparing said color changes of said first images photographed respectively with said plurality of different kinds of stroboscopic light;
selecting one stroboscopic light in which said color change is least from among said plurality of different kinds of stroboscopic light; and
thereby acquiring a final image of the subject.

7. The image acquiring method according to claim 6, wherein said acquiring step of the final image is a step of photographing said subject using said one stroboscopic light to acquire said final image when said first images and said second image are acquired by photographing said reference object or a step of determining as said final image one image of said first images which is acquired by photographing said subject using said one stroboscopic light when said first images and said second image are acquired by photographing said subject.

8. The image acquiring method according to claim 6, wherein an inverse number correlated color temperature of said one kind of stroboscopic light used when the image is finally acquired is in a range of ±50 mired with respect to the inverse number correlated color temperature of a black body radiation locus corresponding to the color of said one kind of stroboscopic light which has the least color change.

9. The image acquiring method according to claim 6, wherein said comparison in terms of color change comprises the steps of:
calculating difference values of colors between said second image and each of said first images with respect to pixels of each image;
calculating a total sum of said difference values of the pixels;
comparing said total sum of each image; and
one kind of stroboscopic light with which the value of the total sum becomes least is selected as a stroboscopic light which has the least color change from among said plurality of different kinds of stroboscopic light.

10. An image acquiring apparatus for photographing an image of a subject using stroboscopic light as external illumination, comprising:
photographing means for photographing the image of the subject;
a stroboscopic lamp for emitting a plurality of different kinds of stroboscopic light having different colors;
means for obtaining color change between an image of said subject acquired without using the stroboscopic light and each of images of said subject acquired using said plurality of different kinds of stroboscopic light; and
stroboscopic light color selecting means for selecting one kind of stroboscopic light which has the least color change for finally acquiring the image of said subject from among said plurality of different kinds of stroboscopic light.

11. The image acquiring apparatus according to claim 10, wherein said plurality of different kinds of stroboscopic light emitted from the stroboscopic lamp have the colors changed along a black body radiation locus and that said stroboscopic light color selecting means selects said one kind of stroboscopic light for finally acquiring the image, based on a point on the black body radiation locus corresponding to a color of said one kind of stroboscopic light having the least color change between said image acquired without using the stroboscopic light and said images acquired using said plurality of different kinds of stroboscopic light.

12. The image acquiring apparatus according to claim 10, wherein an inverse number correlated color temperature of said one kind of stroboscopic light selected by said stroboscopic light color selecting means is in a range of ±50 mired with respect to the inverse number correlated color temperature of a black body radiation locus corresponding to the color of said one kind of stroboscopic light having the least color change.

13. The image acquiring apparatus according to claim 10, further, comprising:
decomposing means for decomposing the color of each image into a luminance signal and a chromaticity signal and that said color change is obtained by determining a magnitude of said color change using only a difference in the chromaticity signal.

14. The image acquiring apparatus according to claim 10, wherein
said means for obtaining color change calculates a difference values of colors between said image acquired without using the stroboscopic light and each of said images acquired by using a plurality of different kinds of stroboscopic light with respect to pixels of each image and calculates a total sum of said difference values of the pixels, and compares said total sum of each image; and said stroboscopic light color selecting means selects one kind of stroboscopic light with which the value of the total sum becomes least, as a stroboscopic light which has the least color change from among said plurality of different kinds of stroboscopic light.

* * * * *